US008755459B2

(12) United States Patent
Nentwig

(10) Patent No.: US 8,755,459 B2
(45) Date of Patent: Jun. 17, 2014

(54) METHODS AND APPARATUSES FOR INTERFERENCE CANCELLATION WITH FREQUENCY ERROR COMPENSATION FOR EQUALIZER ADAPTATION

(75) Inventor: Markus Nentwig, Helsinki (FI)

(73) Assignee: Nokia Corporation, Espoo (FI)

(*) Notice: Subject to any disclaimer, the term of this patent is extended or adjusted under 35 U.S.C. 154(b) by 812 days.

(21) Appl. No.: 12/724,830

(22) Filed: Mar. 16, 2010

(65) Prior Publication Data
US 2011/0228837 A1 Sep. 22, 2011

(51) Int. Cl.
H03K 9/00 (2006.01)

(52) U.S. Cl.
USPC .......................................................... 375/316

(58) Field of Classification Search
CPC .. H04B 1/7117; H04B 1/712; H04L 27/2647; H04L 1/0057; H04L 1/0065
USPC ......... 375/316, 326, 340–341, 362, 267, 144; 329/318–320, 323–325, 358–360; 714/755; 455/506, 65
See application file for complete search history.

(56) References Cited

U.S. PATENT DOCUMENTS

| 5,117,505 | A  | * | 5/1992 | Talwar ........................ 455/278.1 |
| 6,067,297 | A  | * | 5/2000 | Beach ............................. 370/389 |
| 6,385,435 | B1 | * | 5/2002 | Lee ................................. 455/24 |
| 6,570,908 | B1 |   | 5/2003 | Jung |
| 6,856,790 | B1 | * | 2/2005 | He ................................ 455/63.4 |
| 7,539,272 | B2 |   | 5/2009 | Chen |
| 8,023,917 | B2 | * | 9/2011 | Popescu ........................ 455/296 |
| 8,201,050 | B2 | * | 6/2012 | Choi et al. ..................... 714/755 |
| 2004/0166800 | A1 | | 8/2004 | Sun |
| 2006/0269023 | A1 | | 11/2006 | Chimitt et al. |

(Continued)

FOREIGN PATENT DOCUMENTS

| CN | 101321148 A | 12/2008 |
| EP | 0601855 B1 | 9/2001 |

(Continued)

OTHER PUBLICATIONS

Wu-Sheng Lu; Hinamoto, T., "Optimal design of IIR frequency-response-masking filters using second-order cone programming," Circuits and Systems I: Fundamental Theory and Applications, IEEE Transactions on , vol. 50, No. 11, pp. 1401,1412, Nov. 2003 and.*

(Continued)

*Primary Examiner* — Daniel Washburn
*Assistant Examiner* — Fitwi Hailegiorgis
(74) *Attorney, Agent, or Firm* — Squire Sanders (US) LLP

(57) ABSTRACT

In accordance with an example embodiment of the present invention, a method comprises receiving a input signal comprising an interfering signal component and a desired signal component at a wireless device; estimating a frequency error of the interfering signal component; and frequency-shifting the input signal based at least in part on the estimated frequency error. The method also comprises estimating a frequency response based on the frequency-shifted input signal and a reconstructed first cancellation signal; obtaining a second cancellation signal by applying the estimated frequency response to the first cancellation signal; subtracting the second cancellation signal from the input signal; and decoding the desired signal component from the input signal after the second cancellation signal is subtracted from the input signal.

20 Claims, 7 Drawing Sheets

(56) References Cited

U.S. PATENT DOCUMENTS

| | | |
|---|---|---|
| 2007/0009011 A1* | 1/2007 | Coulson .................. 375/144 |
| 2007/0093261 A1* | 4/2007 | Hou et al. ................ 455/506 |
| 2008/0144749 A1 | 6/2008 | Wilhelmsson |
| 2009/0052591 A1 | 2/2009 | Chen |
| 2009/0103669 A1 | 4/2009 | Kolze et al. |
| 2009/0125793 A1 | 5/2009 | Kishigami et al. |
| 2009/0267581 A1 | 10/2009 | Nentwig |
| 2010/0158161 A1* | 6/2010 | Sambhwani et al. ......... 375/341 |
| 2011/0051832 A1* | 3/2011 | Mergen et al. ............... 375/267 |

FOREIGN PATENT DOCUMENTS

| | | |
|---|---|---|
| EP | 1724957 A1 | 11/2006 |
| EP | 2103064 A1 | 9/2009 |
| EP | 2131543 A2 | 12/2009 |
| WO | 2008074730 A1 | 6/2008 |
| WO | 2008115702 A1 | 9/2008 |

OTHER PUBLICATIONS

Clark, M.V.; Greenstein, L.J.; Kennedy, W.K.; Shafi, M., "Matched filter performance bounds for diversity combining receivers in digital mobile radio," Vehicular Technology, IEEE Transactions on, vol. 41, No. 4, pp. 356,362, Nov. 1992.*

Morelli, Michele, et al., "Synchronization Techniques for Orthogonal Frequency Division Multiple Access (OFDMA): A Tutorial Review", Proceedings of the IEEE, vol. 96, No. 7, Jul. 2007, pp. 1394-1427.

Huang, Defeng (David), et al., "An Interference-Cancellation Scheme for Carrier Frequency Offsets Correction in OFDMA Systems", IEEE Transactions on Communications, vol. 53, No. 7, Jul. 2005, pp. 1155-1165.

Notification of First Office Action dated Jul. 4, 2013 corresponding to Chinese Patent Application No. 201110064871.6 and English translation thereof.

Notification of Second Office Action dated Feb. 26, 2014, issued in corresponding Chinese Patent Application No. 201110064871.6.

* cited by examiner

METHODS AND APPARATUSES FOR INTERFERENCE CANCELLATION WITH FREQUENCY ERROR COMPENSATION FOR EQUALIZER ADAPTATION

TECHNICAL FIELD

The present application relates generally to methods and apparatuses for interference cancellation with frequency error compensation for equalizer adaptation.

BACKGROUND

In an optimized local access (OLA) network environment, there may be large number of wireless devices congregated in a small area and communicating with each other in different communication modes such as device-to-device mode and access-point assisted mode. In such a communication environment, unavoidable interference from the nearby devices need to be eliminated or minimized in order for the communicating devices to talk with each other efficiently.

SUMMARY

Various aspects of examples of the invention are set out in the claims.

According to a first aspect of the present invention, a method comprises receiving an input signal comprising an interfering signal component and a desired signal component at a wireless device; estimating a frequency error of the interfering signal component; and frequency-shifting the input signal based at least in part on the estimated frequency error. The method also comprises estimating a frequency response based on the frequency-shifted input signal and a reconstructed first cancellation signal; obtaining a second cancellation signal by applying the estimated frequency response to the first cancellation signal; subtracting the second cancellation signal from the input signal; and decoding the desired signal component from the input signal after the second cancellation signal is subtracted from the input signal.

According to a second aspect of the present invention, an apparatus comprises a radio frequency front-end module configured to receiving an input signal comprising an interfering signal component and a desired signal component. The apparatus also comprises a cancellation receiver configured to estimate a frequency error of the interfering signal component; frequency-shift the input signal based at least in part on the estimated frequency error; estimate a frequency response based on the frequency-shifted signal and a reconstructed first cancellation signal; and apply the estimated frequency response to the first cancellation signal to obtain a second cancellation signal. The apparatus also comprises a main receiver configured to subtract the second cancellation signal from the input signal; and decode the desired signal component from the input signal after the second cancellation signal is subtracted from the input signal.

According to a third aspect of the present invention, an apparatus comprises a frequency offset estimator configured to estimate a frequency error of the interfering signal component of an input signal wherein the input signal comprises the interfering signal component and a desired signal component; a numerically controlled oscillator and a first multiplier configured collectively to frequency-shift the input signal based at least in part on the estimated frequency error of the interfering signal component; an equalizer adaptation module configured to estimate a frequency response based on the frequency-shifted input signal and a first cancellation signal; an equalizer configured to apply the estimated frequency response to the first cancellation signal to obtain a second cancellation signal; and a second multiplier configured to re-construct the frequency-shifted interfering signal component of the input signal.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings.

Figure 1:
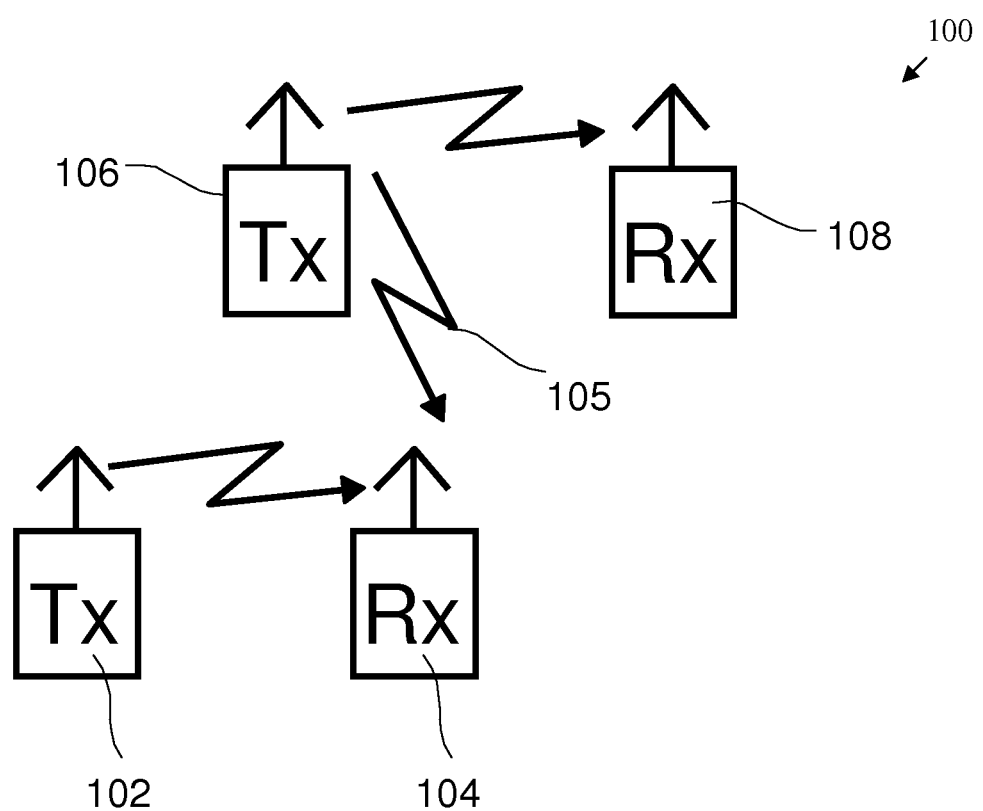
FIG. 1 illustrates an example local wireless system in accordance with an example embodiment of the invention.

FIG. 1 illustrates an example local wireless system 100 in accordance with an example embodiment of the invention. The local wireless system 100 includes a first pair of communicating wireless devices comprising a transmitter 102 and a receiver 104 and a second pair of communicating wireless devices comprising a transmitter 106 and a receiver 108. These transmitters and receivers may be mobile stations, access points or base stations.

In one example embodiment, the first pair of wireless devices 102 and 104 is in an active communication session with each other and the second pair of the wireless devices 106 and 108 is in a separate communication session with each other. Due to close proximity of locations of the two pairs of wireless devices, an interfering signal 105 sent from the transmitter 106 interferes with the communications between the first pair of the wireless devices 102 and 104. In one example embodiment, the wireless device 104 has an interference cancellation module that may cancel or minimize the interference signal 105 from the transmitter 106. The interference cancellation module within the receiver 104 first decodes the interfering signal from transmitter 106, reconstructs the interfering signal and subtracts it from the received input signal. It then decodes the weaker signal received from the transmitter 102.

Figure 2:
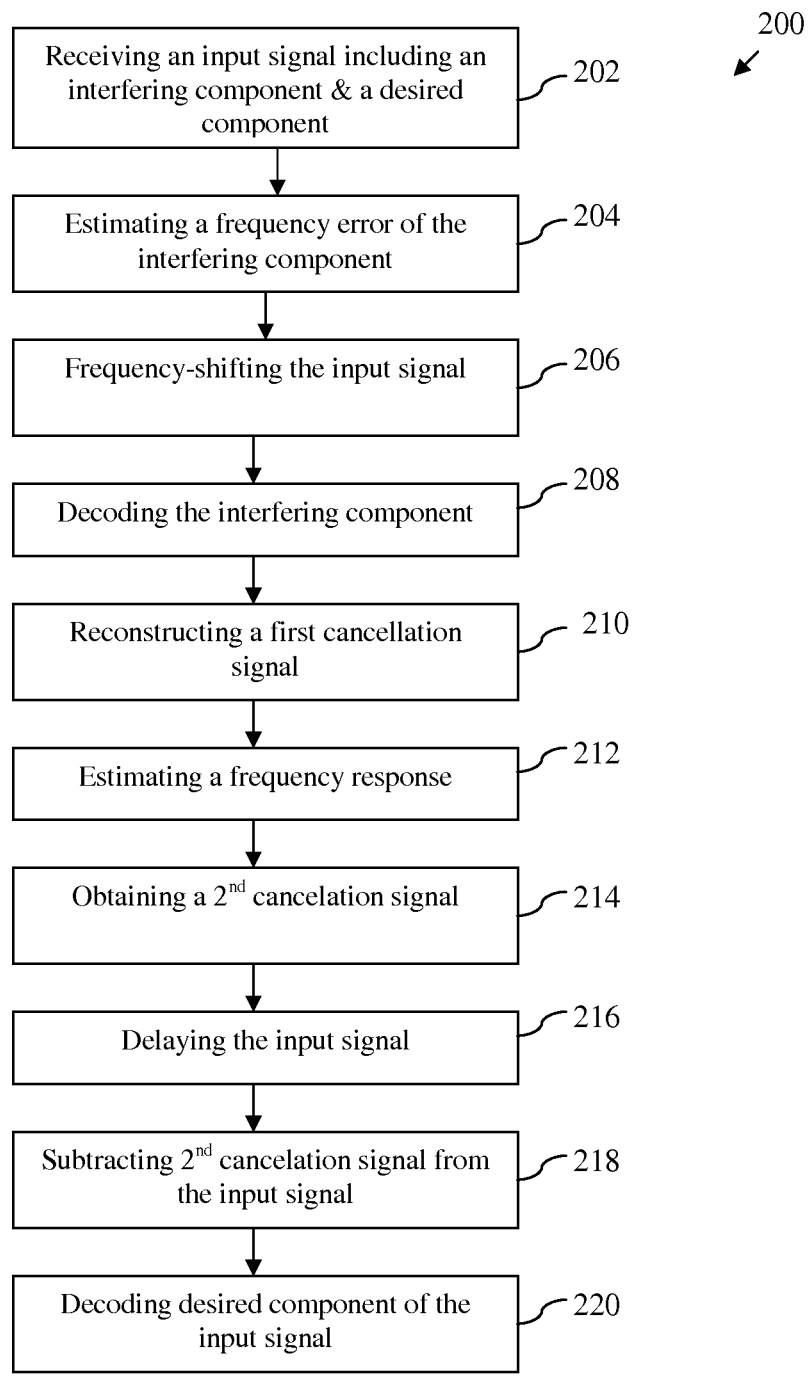
FIG. 2 illustrates an example method for interference cancellation with frequency error compensation in accordance with an example embodiment of the invention.

FIG. 2 illustrates an example method 200 for interference cancellation with frequency error compensation in accordance with an example embodiment of the invention. The method 200 includes receiving an input signal comprising an interfering signal component and a desired signal component at block 202, estimating a frequency error of the interfering signal component at block 204, and frequency-shifting the received input signal at block 206. The method 200 also includes decoding the interfering signal component at block 208, reconstructing a first cancellation signal at block 210, and estimating a frequency response at block 212. The method 200 also includes obtaining a second cancellation signal at block 214 and delaying the input signal at block 216. The method 200 also includes subtracting the second cancellation signal from the input signal at 218 and decoding the desired signal component of the input signal at block 220.

In one example embodiment, receiving the input signal at block 202 may include receiving an OFDM signal from two different neighbor wireless devices, the OFDM signal including an interfering signal component from an interfering device and a desired signal component from a target device. The two signal components of the OFDM signal merge into the input signal due to the fact that the two devices are transmitting using a shared radio channel, frequency band, time slot, code set or other shared radio resource.

In one example embodiment, estimating a frequency error of the interfering signal component at block 204 may include spectral signal analysis using a discrete Fourier transform algorithm (DFT) or a Multiple Signal Classification algorithm (MUSIC). Estimating the frequency error may also include calculating a first phase of a first known pilot tone and a second phase of a second pilot tone in the input signal, calculating a phase difference between first and second phase, and calculating a frequency error estimate based on the phase difference and a predetermined time interval. Estimating the frequency error may also include determining an initial frequency error estimate, and iteratively updating the frequency error estimate. Iterative updating of the frequency error estimate may be performed using a phase-locked loop (PLL) algorithm. In one example embodiment, the frequency error of the interfering signal component may be estimated based on an estimated frequency error of the desired signal component. For example, it may be known a-priori that the main source of frequency error is a radio receiver processing the input signal, causing an identical frequency error to the desired and interfering signal components. Thus, the frequency error of the interfering signal component may be obtained by estimating the frequency error of the desired signal component. In another example embodiment, the frequency error of the interfering signal component is estimated as the frequency error of an oscillator signal of a radio receiver relative to a reference frequency signal, for example, obtained from a received global positioning system (GPS) signal.

In one example embodiment, frequency-shifting the input signal at block 206 may include aligning the interfering signal component with a subcarrier grid of an OFDM decoder based on the estimated frequency error. Decoding the interfering signal component at block 208 may include decoding the interfering signal component using a decoding method such as demodulation, Turbo decoding, low-density parity check (LDPC) decoding, or maximum likelihood decoding. Decoding the interfering signal component at block 208 may also include applying channel estimation and channel equalization to the input signal. Reconstructing a first cancellation signal at block 210 may include applying an encoding process to the decoded interfering signal component. The encoding process may function as an inverse operation of the decoding process in step 208.

In one example embodiment, estimating a frequency response at block 212 may include calculating a measure of correlation between the frequency-shifted input signal and the reconstructed first cancellation signal. The measure of correlation may be determined by determining a product between a sample of the frequency-shifted input signal and a time-aligned sample of the reconstructed first cancellation signal, where the samples may be complex-valued. A coherent processing method may operate on time-aligned pairs of samples of two signals comprising amplitude information and phase information. The coherent processing method may utilize both amplitude and phase information of a signal, whereas a non-coherent processing method may discard for example phase information prior to or during the signal processing. In one embodiment, estimating a frequency response at block 212 may also include calculating the measure of correlation using an adaptive equalizer algorithm, where the frequency shifted input signal is provided as a reference signal and the reconstructed first cancellation signal is provided as input signal to the adaptive equalizer algorithm. Other example methods for estimating the frequency response may include time- and frequency domain methods for performing zero-forcing and minimum mean-square-error methods. The estimated frequency response may be applied using a time- or frequency domain equalizer, for example. Methods to implement a time domain equalizer comprise finite impulse response (FIR) filters. A FIR filter may be configured to apply an estimated frequency response by an adaptive equalizer algorithm. Obtaining a second cancellation signal at block 214 may include applying the estimated frequency response to the reconstructed first cancellation signal.

In one example embodiment, delaying the receiving signal at block 216 may include delaying the received input signal sufficiently long to allow for the above discussed processing of the interfering signal component of the input signal. Upon completion of processing the interfering signal component of the input signal and obtaining the second cancellation signal, subtracting the second cancellation signal from the input signal at 218 may include adding or subtracting the second cancellation signal from the complex-valued samples of the input signal. Decoding the desired signal component of the input signal at block 220 may include using methods such as demodulation, Turbo decoding, low-density parity check (LDPC) decoding, or maximum likelihood decoding.

Figure 3A:
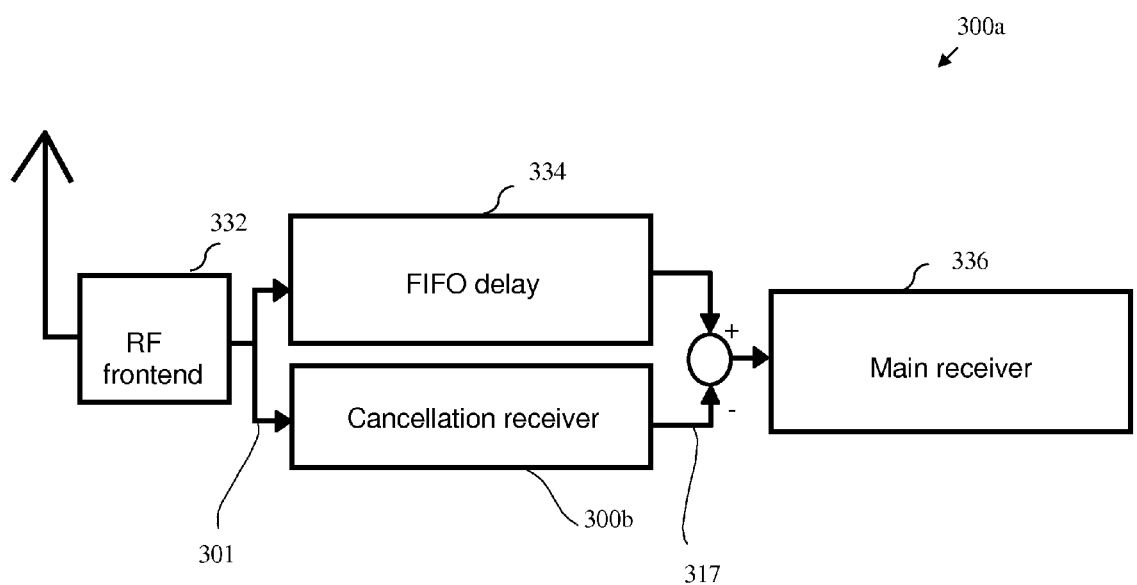
FIG. 3a illustrates an example apparatus for interference cancellation in accordance with an example embodiment of the invention.
Figure 3B:
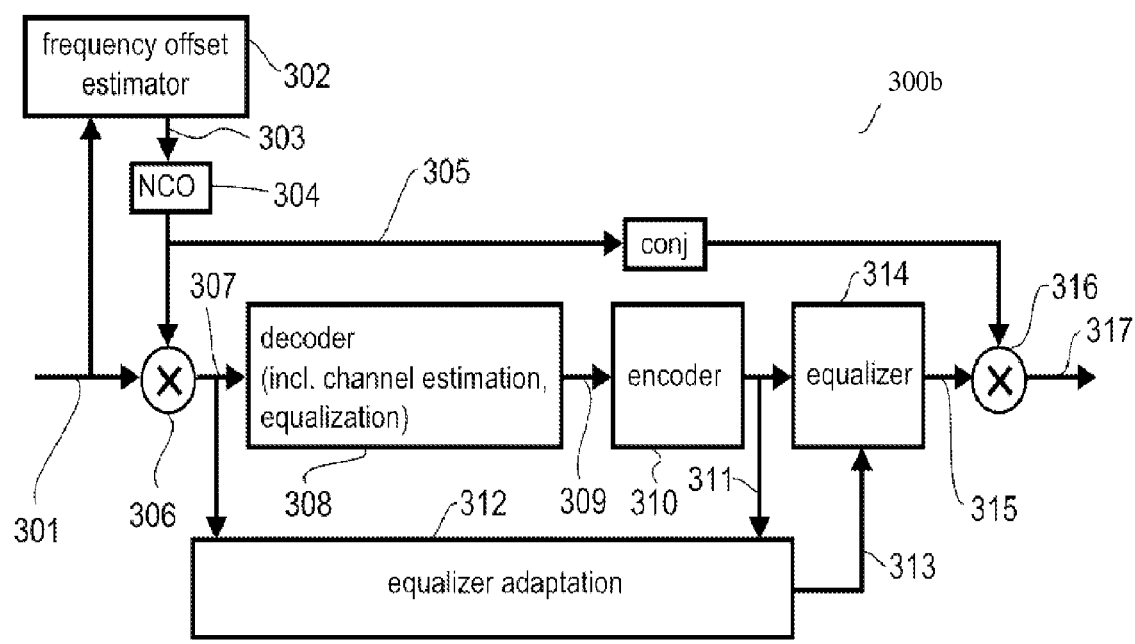
FIG. 3b illustrates an example apparatus for interference cancellation in accordance with an example embodiment of the invention.
Figure 7:
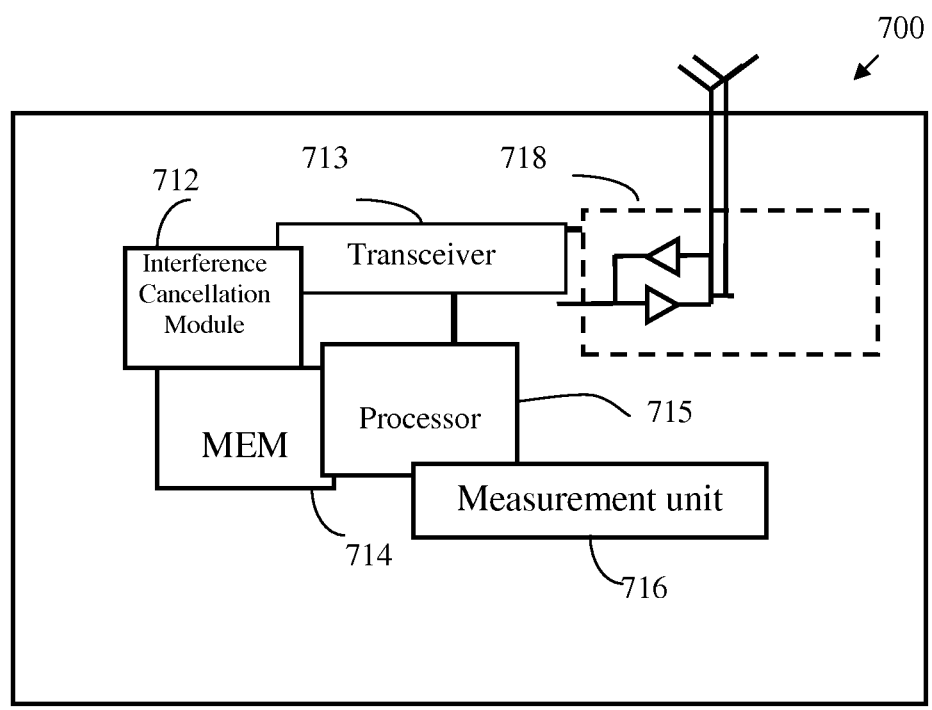
FIG. 7 illustrates an example wireless apparatus in accordance with an example embodiment of the invention.

In one example embodiment, the method 200 may be implemented in any of the wireless devices 102, 104, 106 and 108 of FIG. 1 or by the apparatus 300a of FIG. 3a, the apparatus 300b of FIG. 3b or the apparatus 700 of FIG. 7. The method 200 is for illustration only and the steps of the method 200 may be combined, divided, or executed in a different order than illustrated, without departing from the scope of the invention of this example embodiment.

FIG. 3a illustrates an example apparatus 300a for interference cancellation in accordance with an example embodiment of the invention. The apparatus 300a include a radio frequency (RF) front end 332, a first-in-first-out (FIFO) delay module 334, an interference cancellation module 300b and a main receiver 336. The radio frontend 332 may be configured to receive the input signal 301 that may include a desired signal component and an interfering signal component. The FIFO delay module 334 receives a copy of the received input signal and delays the input signal enough to allow the cancellation receiver 300b to process the interfering signal component of the input signal. Then cancellation receiver 300b processes the input signal 301 by decoding the interfering signal component of the input signal, and generating a cancellation signal 317. The cancellation signal 317 is an isolated and reconstructed interfering signal component of the input signal 301. The cancellation signal 317 is then subtracted from the delayed input signal, and provided to the main receiver 336 for decoding of the desired signal stream.

FIG. 3b illustrates an example apparatus 300b for interference cancellation in accordance with an example embodiment of the invention. In one example embodiment, the apparatus 300b includes a frequency offset estimator 302, a generic numerically controlled oscillator (NCO) 304, a first multiplier 306, a decoder 308, an encoder 310, an equalizer adaptation module 312, an equalizer 314, and a second multiplier 316.

In one example embodiment, the frequency offset estimator 302 may be configured to receive an input signal 301 from a module such as the radio frontend 332 of FIG. 3a. The input signal 301 may include a desired signal component and an interfering signal component. It is the goal of the interference cancellation apparatus 300b to accurately reconstruct the interfering signal component of the input signal 301, so that it can be eliminated or minimized by apparatus 300a. The frequency offset estimator 302 may be configured to estimate a frequency offset 303 of the interfering signal component of the input signal 301 and input the estimated frequency offset 303 to the NCO 304. In another embodiment, the frequency offset estimator 302 estimates the frequency offset 303 of the interfering signal component by estimating the frequency error of the desired signal component in input signal 301, using a-priori information on frequency errors of the input signal. In yet another embodiment, the frequency offset estimator 302 estimates the frequency offset 303 of the interfering signal component by estimating a frequency error of a local oscillator in a radio receiver or transceiver, for example radio frequency frontend 332 in FIG. 3a. The frequency error of a local oscillator may be estimated by comparing the local oscillator to a reference frequency signal, obtained from a received GPS signal.

In one example embodiment, the NCO 304 and the first multiplier may collectively be configured to frequency-shifting the input signal based on the estimated frequency offset 303 and the input signal 301. The NCO 304 may generate a complex-valued correction signal 305 $s(t)=\exp(-i\ 2\pi f\ t)$, where f is the estimated frequency offset, t is time and $i=\sqrt{-1}$.

In one example embodiment, the first complex multiplier 306 may multiply the input signal 301 with the correction signal 305. The resulting frequency-corrected signal 307 is then decoded in decoder 308. The decoder 308 may apply channel estimation and equalization to the input signal. In one embodiment, the input signal is shifted by the amount proportional to the estimated frequency offset 303 and shifted input signal 307 is input into the decoder 308. The decoder 308 may be configured to decode the interfering signal component of the shifted input signal 307. The decoded interfering signal component 309 of the input signal is input into the encoder 310 which is configured to reconstruct a first cancellation signal 311 based on the decoded interfering signal component 309.

In one embodiment, the equalization adaption module 312 is configured to estimate a frequency response 313 based on the frequency-shifted input signal 307 from the first multiplier 306 and the first cancellation signal 311. Based on frequency-corrected input signal 307 and re-encoded signal 311, the equalizer adaptation module 312 may use an equalizer adaptation algorithm to determine an equalizer configuration 313 that is then applied via equalizer 314 to re-encoded signal 311. The equalizer adaptation algorithm 312 may aim to minimize a least-squares error between equalized re-encoded signal 315 and frequency-corrected input signal 307. In one embodiment, the equalized re-encoded signal 315 is provided to equalizer adaptation module 312.

In one example embodiment, the equalizer 314 is configured to apply the equalizer configuration 313 to the first cancellation signal 311 and generate an equalized re-encoded signal 315. The second complex multiplier 316 may multiply the equalized re-encoded signal 315 with the complex conjugate of the correction signal 305, resulting in a frequency-shifted reconstructed signal 317, located at the same frequency position as the received interfering signal component in 301.

Figure 4:
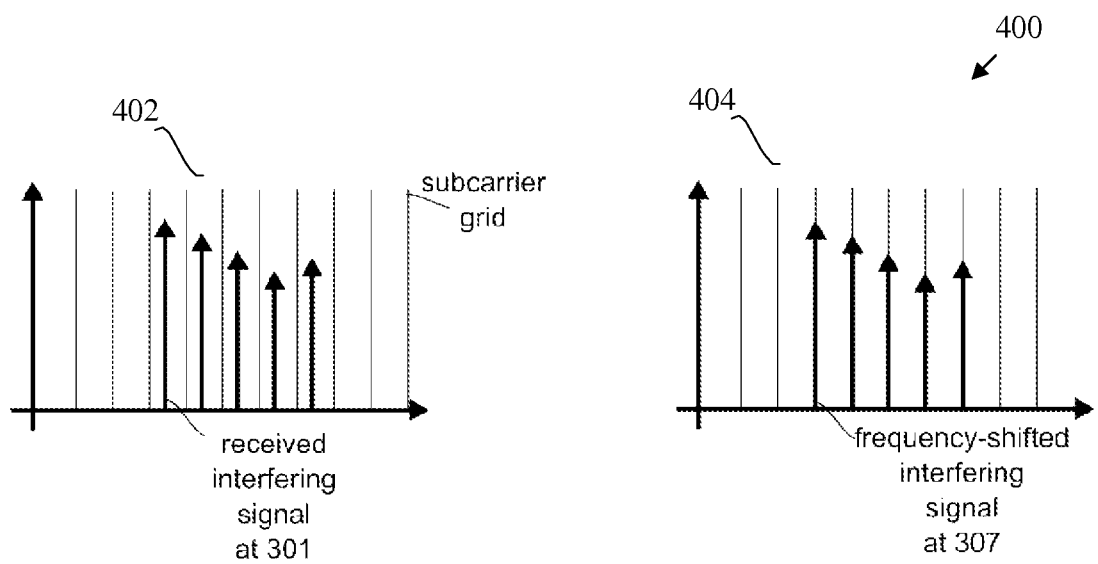
FIG. 4 illustrates an example interference component of a received input signal before and after a frequency-shifting operation in accordance with an example embodiment of the invention.

FIG. 4 illustrates an example frequency-shifting operation 400 for the interfering signal component of the received input signal in accordance with an example embodiment of the invention. The example frequency-shifting operation 400 includes a signal illustration 402 before frequency shifting operation and a signal illustration 404 after the frequency shifting operation. The signal illustration 402 shows the received interfering signal component 301 before the multiplication by the first multiplier 306 of FIG. 3b with the interfering signal component not aligned with an OFDM sub-carrier grid. The signal illustration 404 shows the interfering signal component 307 after the frequency shifting operation at the multiplier 306 of FIG. 3b where the interfering signal component is aligned with the OFDM sub-carrier grid. Both signal illustrations 402 and 404 only show the interfering signal component of the input signal with the desired signal component of the input signal omitted for clarity.

Figure 5:
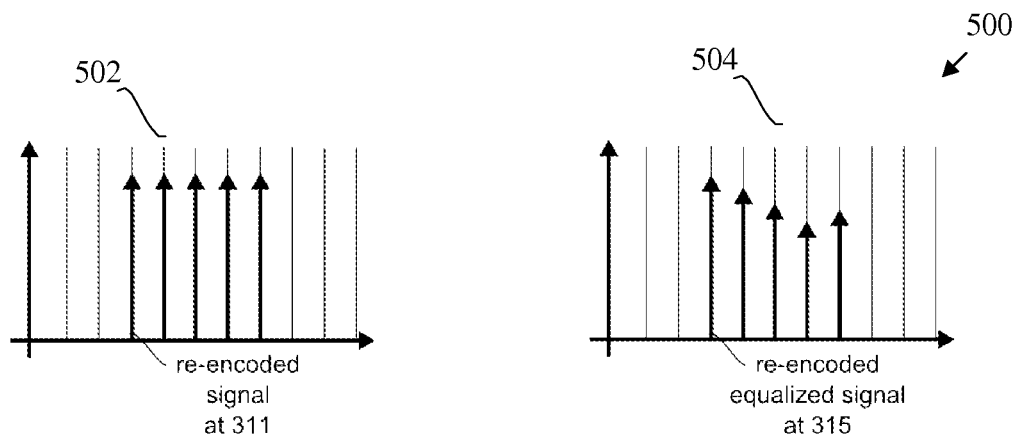
FIG. 5 illustrates an example signal equalization in accordance with an example embodiment of the invention.

FIG. 5 illustrates an example signal equalization operation 500 in accordance with an example embodiment of the invention. The part 502 of the equalization operation 500 shows the re-encoded signal 311 before the equalization operation at the equalizer 314 of FIG. 3b where the spectrum of the re-encoded interfering signal 311 is flat, as is common for OFDM-like signals. The part 504 of the equalization operation 500 shows the signal 315 after equalization operation is performed at the equalizer 314 of FIG. 3b where the spectrum of the interfering signal component in the received input signal is applied to the re-encoded interfering signal 311.

Figure 6:
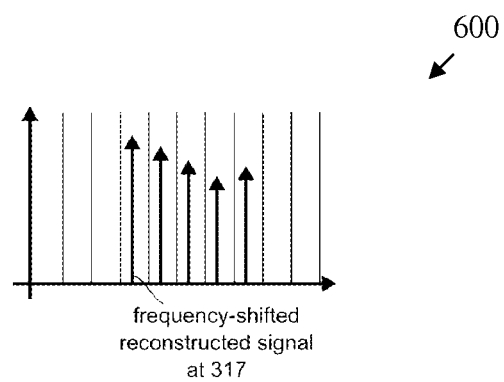
FIG. 6 illustrates an example reconstructed interfering signal component after equalization and frequency shifting in accordance with an example embodiment of the invention.

FIG. 6 illustrates an example reconstructed interfering signal component 600 after equalization and frequency shifting in accordance with an example embodiment of the invention. The equalized signal 315 is further frequency-shifted at the second multiplier 316 of FIG. 3b and yield the signal 317 that is similar to the received interfering signal component 301. Then the frequency-shifted signal 317 may be subtracted from the input signal, improving signal-to-noise-and-interference ratio during the decoding of the desired signal component of the input signal.

FIG. 7 is a block diagram illustrating an example wireless apparatus 700 in accordance with an example embodiment of the invention. In FIG. 7, the wireless apparatus 700 may include a processor 715, a memory 714 coupled to the processor 715, and a suitable transceiver 713 (having a transmitter (TX) and a receiver (RX)) coupled to the processor 715, coupled to an antenna unit 718. Coupled with the transceiver 713 and other components such as memory 714 is an interference cancellation module 712.

In an example embodiment, the processor 715 or some other form of generic central processing unit (CPU) or special-purpose processor such as digital signal processor (DSP), may operate to control the various components of the wireless apparatus 700 in accordance with embedded software or firmware stored in memory 714 or stored in memory contained within the processor 715 itself. In addition to the embedded software or firmware, the processor 715 may execute other applications or application modules stored in the memory 714 or made available via wireless network communications. The application software may comprise a compiled set of machine-readable instructions that configures the processor 715 to provide the desired functionality, or the application software may be high-level software instructions to be processed by an interpreter or compiler to indirectly configure the processor 715.

In an example embodiment, the interference cancellation module 712 may be configured to receive an input signal comprising an interfering signal component and a desired signal component at a wireless device, estimate a frequency error of the interfering signal component, and frequency-shift the input signal based at least in part on the estimated frequency error. The interference cancellation module 712 may also be configured to estimate a frequency response based on the frequency-shifted input signal and a reconstructed first cancellation signal, and obtain a second cancellation signal by applying the estimated frequency response to the first cancellation signal. The interference cancellation module 712 may also be configured to subtract the second cancellation signal from the input signal; and decode the desired signal component from the input signal after the second cancellation signal is subtracted from the input signal. In an example embodiment, the interference cancellation module 712 may be configured to interwork with other modules such as the transceiver 713.

In one example embodiment, the transceiver 713 is for bidirectional wireless communications with another wireless device. The transceiver 713 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 713, portions of the antenna unit 718, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 718 may be provided to convert between wireless signals and electrical signals, enabling the wireless apparatus 700 to send and receive information from a cellular network or some other available wireless communications network or from a peer wireless device. In an embodiment, the antenna unit 718 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 718 may include antenna tuning and/or impedance matching components, RF power amplifiers, and/or low noise amplifiers.

As shown in FIG. 7, the wireless apparatus 700 may further include a measurement unit 716, which measures the signal strength level that is received from another wireless device, and compare the measurements with a configured threshold. The measurement unit may be utilized by the wireless apparatus 700 in conjunction with various exemplary embodiments of the invention, as described herein.

In general, the various exemplary embodiments of the wireless apparatus 700 may include, but are not limited to, part of a user equipment, or a wireless device such as a portable computer having wireless communication capabilities, Internet appliances permitting wireless Internet access and browsing, as well as portable units or terminals that incorporate combinations of such functions.

Without in any way limiting the scope, interpretation, or application of the claims appearing below, a technical effect of one or more of the example embodiments disclosed herein is to cancel or minimize interference emitted from wireless device to neighboring wireless communicating device. Another technical effect of one or more of the example embodiments disclosed herein is to carry out the interference cancellation efficiently because the interference cancellation module may be implemented in silicon.

Embodiments of the present invention may be implemented in software, hardware, application logic or a combination of software, hardware and application logic. The software, application logic and/or hardware may reside on a base station or an access point. If desired, part of the software, application logic and/or hardware may reside on access point, part of the software, application logic and/or hardware may reside on a network element such as a user equipment and part of the software, application logic and/or hardware may reside on relay node. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 7. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:

receiving an input signal comprising an interfering signal component and a desired signal component at a wireless device;

estimating a frequency error of the interfering signal component immediately after receiving the input signal;

frequency-shifting the input signal based at least in part on the estimated frequency error of the interfering signal component, wherein the frequency-shifting comprises generating a complex-valued correction signal $s(t)=\exp(-i 2\pi f t)$, where f is the estimated frequency error, t is time and $i=\sqrt{-1}$;

decoding the interfering signal component;
estimating a frequency response based on the frequency-shifted input signal and a reconstructed first cancellation signal based on the decoded interfering signal component;
obtaining a second cancellation signal by applying the estimated frequency response to the first cancellation signal;
subtracting the second cancellation signal from the input signal;
decoding the desired signal component from the input signal after the second cancellation signal is subtracted from the input signal; and
re-constructing the frequency-shifted interfering signal component of the input signal.

2. The method of claim 1, further comprising decoding the interfering signal component from the input signal before estimating the frequency response.

3. The method of claim 2 wherein decoding the interfering signal component further comprises applying a channel estimation and a channel equalization to the interfering signal component of the input signal.

4. The method of claim 2, further comprising obtaining the reconstructed first cancellation signal by reconstructing the first cancellation signal from the interfering signal component of the input signal after the interfering signal component is decoded.

5. The method of claim 2 wherein estimating the frequency response further comprises estimating the frequency response coherently.

6. The method of claim 2, further comprising
delaying the input signal for a predetermined amount of time before subtracting the second cancellation signal from the input signal.

7. The method of claim 2 wherein decoding the interfering signal component comprises decoding the interfering signal component from the frequency-shifted interfering signal component.

8. The method of claim 1, further comprising frequency shifting the input signal and the first cancellation signal based on the estimated frequency error before subtracting the second cancellation signal from the input signal.

9. The method of claim 8 wherein frequency-shifting the input signal further comprises aligning the interfering signal component of the input signal with a subcarrier grid of the input signal.

10. The method of claim 1 wherein decoding the desired signal component of the input signal further comprises demodulating the input signal and extracting the desired signal component from the demodulated input signal.

11. An apparatus, comprising:
a radio frequency front-end module configured to receive an input signal comprising an interfering signal component and a desired signal component;
a cancellation receiver configured to estimate a frequency error of the interfering signal component immediately after receiving the input signal;
frequency-shift the input signal based at least in part on the estimated frequency error of the interfering signal component;
generate a complex-valued correction signal $s(t)=\exp(-i 2\pi f t)$, where f is the estimated frequency error, t is time and $i=\sqrt{-1}$;
decode the interfering signal component;
estimate a frequency response based on the frequency-shifted signal and a reconstructed first cancellation signal based on the decoded interfering signal component;
apply the estimated frequency response to the first cancellation signal to obtain a second cancellation signal; and
re-construct the frequency-shifted interfering signal component of the input signal; and
a main receiver configured to
subtract the second cancellation signal from the input signal; and
decode the desired signal component from the input signal after the second cancellation signal is subtracted from the input signal.

12. The apparatus of claim 11 wherein the cancellation receiver is further configured to decode the interfering signal component from the input signal.

13. The apparatus of claim 12 wherein the cancellation receiver is further configured to obtain the reconstructed first cancellation signal via reconstructing the first cancellation signal based at least in part on the decoded interfering signal component.

14. The apparatus of claim 11 further comprising a delay module configured to delay the input signal for a predetermined amount of time before subtracting the second cancellation signal from the input signal.

15. The apparatus of claim 11, wherein the input signal is an OFDM signal.

16. An apparatus, comprising
a frequency offset estimator configured to estimate a frequency error of the interfering signal component of an input signal immediately after receiving the input signal, wherein the input signal comprises the interfering signal component and a desired signal component;
a numerically controlled oscillator and a first multiplier configured collectively to frequency-shift the input signal based at least in part on the estimated frequency error of the interfering signal component, wherein the numerically controlled oscillator is configured to generate a complex-valued correction signal $s(t)=\exp(-i 2\pi f t)$, where f is the estimated frequency error, t is time and $i=\sqrt{-1}$;
an equalizer adaptation module configured to decode the interfering signal component and estimate a frequency response based on the frequency-shifted input signal and a reconstructed first cancellation signal based on the decoded interfering signal component;
an equalizer configured to apply the estimated frequency response to the first cancellation signal to obtain a second cancellation signal; and
a second multiplier configured to re-construct the frequency-shifted interfering signal component of the input signal.

17. The apparatus of claim 16 further comprising
a decoder configured to decode the frequency-shifted input signal; and
an encoder configured to re-encode the decoded input signal.

18. The apparatus of claim 16 further comprising
a subtraction module configured to subtract the reconstructed interfering signal component of the input signal from a delayed input signal; and
a main receiver configured to decode the desired signal component.

19. The apparatus of claim 16 further comprising
a radio front-end module configured to receive the input signal comprising the desired signal component and the interfering signal component from a wireless device.

20. An apparatus, comprising
a frequency offset estimator configured to estimate a frequency error of the interfering signal component of an input signal, wherein the input signal comprises the interfering signal component and a desired signal component;

a numerically controlled oscillator and a first multiplier configured collectively to frequency-shift the input signal based at least in part on the estimated frequency error of the interfering signal component;

an equalizer adaptation module configured to estimate a frequency response based on the frequency-shifted input signal and a first cancellation signal;

an equalizer configured to apply the estimated frequency response to the first cancellation signal to obtain a second cancellation signal; and a second multiplier configured to re-construct the frequency-shifted interfering signal component of the input signal, wherein the numerically controlled oscillator is configured to generate a complex-valued correction signal $s(t)=\exp(-i\, 2\pi\, f\, t)$, where f is the estimated frequency error, t is time and $i=\sqrt{-1}$.

* * * * *